US009566963B2

(12) United States Patent
Harrer

(10) Patent No.: US 9,566,963 B2
(45) Date of Patent: Feb. 14, 2017

(54) METHOD OF DECREASING BRAKING DISTANCE

(71) Applicant: Robert Bosch GmbH, Stuttgart (DE)

(72) Inventor: Dino Harrer, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/750,579

(22) Filed: Jun. 25, 2015

(65) Prior Publication Data
US 2016/0375883 A1 Dec. 29, 2016

(51) Int. Cl.
*B60T 8/24* (2006.01)
*B60T 8/1763* (2006.01)
*B60T 8/171* (2006.01)
*B60T 8/172* (2006.01)
*B60T 8/1761* (2006.01)

(52) U.S. Cl.
CPC ............ *B60T 8/17636* (2013.01); *B60T 8/171* (2013.01); *B60T 8/172* (2013.01); *B60T 8/17616* (2013.01); *B60T 8/246* (2013.01)

(58) Field of Classification Search
CPC ................. B60R 10/0315; B60R 21/01; B60R 21/01512; B60K 28/14
USPC ........................ 701/45, 70, 72, 31.7; 180/268
See application file for complete search history.

(56) References Cited

U.S. PATENT DOCUMENTS

| 5,586,028 A | 12/1996 | Sekine et al. |
| 6,260,935 B1 | 7/2001 | Abe et al. |
| 6,285,393 B1 | 9/2001 | Shimoura et al. |
| 2002/0045981 A1 | 4/2002 | Ichikawa et al. |
| 2010/0049375 A1* | 2/2010 | Tanimoto ................. B60T 7/12 701/1 |
| 2013/0231825 A1 | 9/2013 | Chundrlik, Jr. et al. |
| 2014/0347448 A1 | 11/2014 | Hegemann et al. |
| 2015/0025769 A1 | 1/2015 | Franganillo et al. |
| 2015/0169967 A1* | 6/2015 | Nakamura ............... G06K 9/03 382/104 |

FOREIGN PATENT DOCUMENTS

| CN | 104166834 | 11/2014 |
| DE | 112012006147 | 1/2015 |
| WO | 2011/069191 | 6/2011 |
| WO | 2014/199863 | 12/2014 |

OTHER PUBLICATIONS

Extended European Search Report for Application No. 16170517.3 dated Oct. 25, 2016 (7 pages).

* cited by examiner

*Primary Examiner* — Gertrude Arthur Jeanglaud
(74) *Attorney, Agent, or Firm* — Michael Best & Friedrich LLP

(57) ABSTRACT

A system and a method of operating an antilock braking system in a vehicle. The system and method include an electronic control unit that monitors an angle sensor to determine whether the vehicle is moving straight. The electronic control unit also monitors a plurality of images produced from a vehicle camera orientated towards a road surface. The electronic control unit determines a type of road surface and whether the road surface is slippery based on these images. The electronic control unit operates the antilock braking system in a plurality of modes depending on information received about the road surface and the angle sensor.

20 Claims, 3 Drawing Sheets

METHOD OF DECREASING BRAKING DISTANCE

BACKGROUND

Embodiments of the invention relate to systems and method of reducing braking distance on various road surfaces.

SUMMARY

In one embodiment, the invention provides a control system for operating a vehicle braking system. The control system includes a sensor that senses an angle of the vehicle, a camera attached to the vehicle with a field of view of a road surface, and an electronic control unit communicatively connected to the camera and communicatively connected to the steering angle sensor. The electronic control unit is configured to receive images of the road surface from the camera and determine a type of road surface based on the images of the road surface. The electronic control unit generates a control message based on the type of road surface and the steering angle. An antilock braking control unit is communicatively connected to the electronic control unit. The antilock braking control unit is configured to receive the control message from the electronic control unit, operate the braking system of the vehicle; and adjust the operation of the braking system based on the control message.

In another embodiment the invention provides a method of operating a braking system of a vehicle. The method of operating the braking system includes the following steps. An angle of the vehicle is determined. An image of a road surface is received with a camera attached to the vehicle. An electronic control unit determines a type of road surface based on the image of the road surface, sends a control message to an antilock braking system control unit based on the type of road surface and the angle, and operates the braking system of the vehicle based on the control message.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
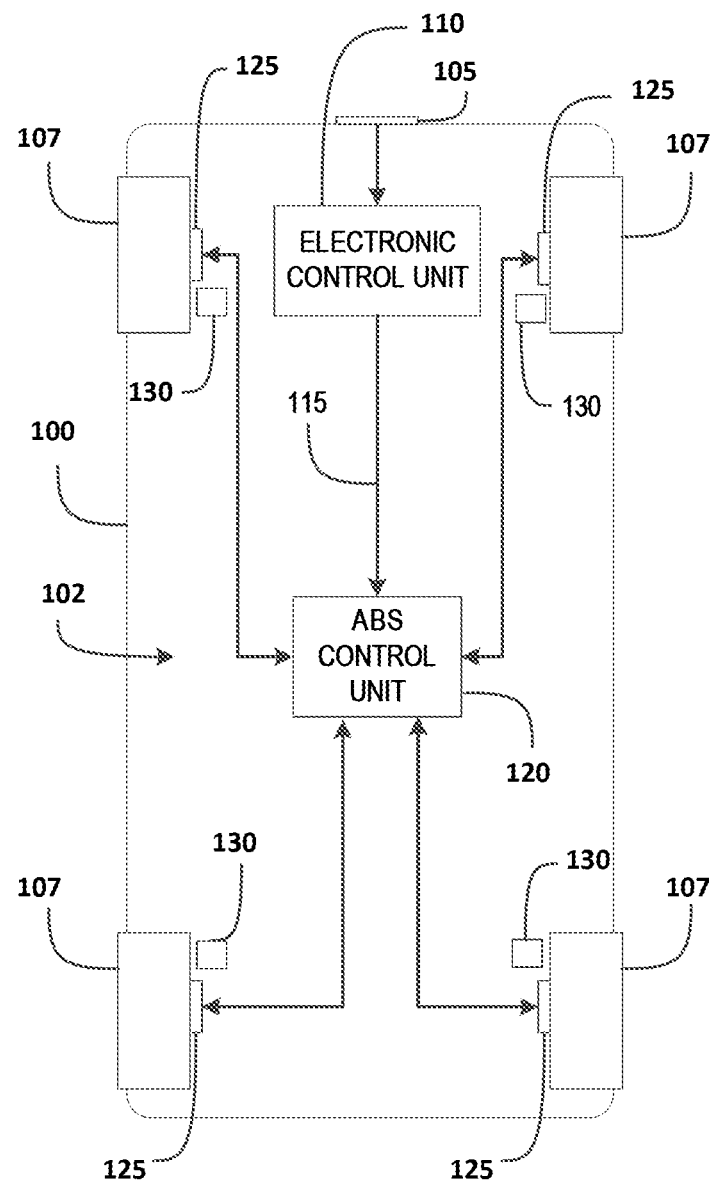
FIG. 1 is an illustration of a vehicle equipped with an antilock braking system and an electronic control unit for setting a mode of the antilock braking system.

FIG. 1 illustrates a vehicle 100 equipped with an antilock braking system (ABS 102). In one embodiment, the vehicle 100 includes a camera 105, an electronic control unit (ECU 110), and a vehicle communication bus 115 (e.g., a CAN bus). The ABS 102 includes an antilock braking system control unit (ABS control unit 120), brakes 125, wheels 107, and wheel speed sensors 130. The camera 105 is communicatively coupled to the ECU 110 such that the ECU 110 receives a plurality of images captured by the camera 105. The ECU 110 processes the plurality of images from the camera 105 and detects a type of road surface based on the images. The communication bus 115 communicatively couples the ECU 110 with the ABS control unit 120 and thus enables communications from the ECU 110 to the ABS control unit 120. In other embodiments, the ABS control unit 120 and the ECU 110 are combined in a single unit. In such an embodiment, the processing and control tasks may be performed by a single set of control hardware. The ABS 102 and the methods disclosed herein are able to fully operate in conjunction with an electronic stability program (ESP) or an electronic stability control (ESC).

Figure 2:
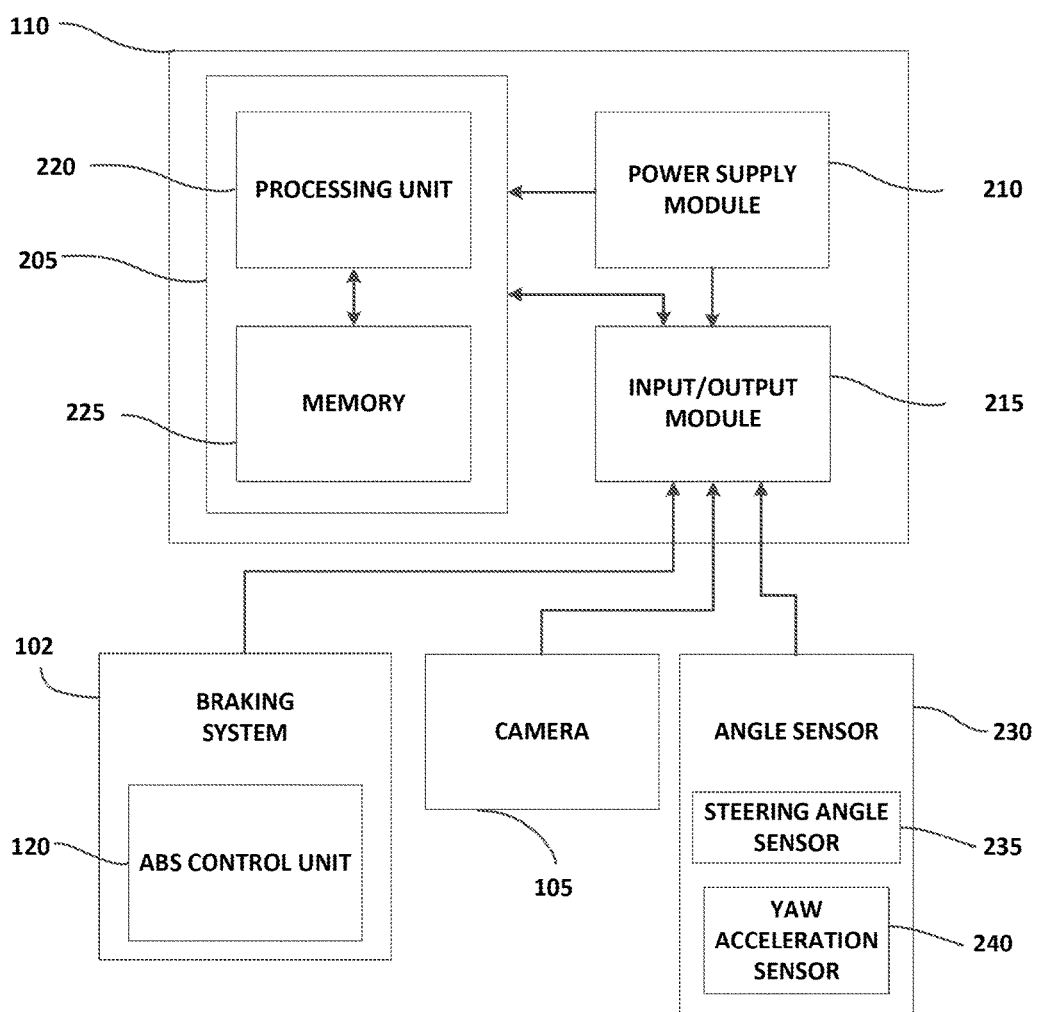
FIG. 2 is a block diagram of the electronic control unit of FIG. 1.

FIG. 2 is a block diagram of an embodiment of the ECU 110. The ECU 110 includes a plurality of electrical and electronic components that provide power, operation control, and protection to the components and modules within the ECU 110 and/or the camera 105. For example, the ECU 110 includes, among other things, a controller 205 (such as a programmable microprocessor, microcontroller, or similar device), a power supply module 210, and an input/output module 215. The controller 205 includes, among other things, a processing unit 220 and a memory 225. The processing unit 220 is electrically connected to the memory 225, and executes instructions which are capable of being stored on the memory 225. The controller 205 is configured to retrieve from memory 225 and execute, among other things, instructions related to the control processes and methods described herein. In other embodiments, the ECU 110 includes additional, fewer, or different components. In some embodiments, the controller 205 includes multiple controllers and/or software routines dedicated to each function of the ECU 110. The ECU 110 determines road surface conditions based on images from the camera 105 using these software routines. After the type of road surface is determined, the ECU 110 transmits control signals over the communication bus 115 based, at least in part, on the type of road surface. The road surface information is processed by the ABS control unit 120 according to the methods described herein.

The input/output module 215 transmits and receives information between the ECU 110 and external devices. In the illustrative embodiment, the input/output module 215 communicates information with the ABS control unit 120, the camera 105, and an angle sensor 230 of the vehicle 100. The input/output module 215 may include various input/output components that are dedicated to each input/output function. For example, the input/output module 215 may have dedicated input and processing circuitry to handle an image feed from the camera 105. In one embodiment, the input/output module 215 receives a signal from the angle sensor 230 indicative of an angular position of a steering wheel. The angular position of the steering wheel may be detected with a steering angle sensor 235 positioned on a steering column of the vehicle 100. In another embodiment, the angle sensor 230 includes a yaw acceleration sensor 240. In such an embodiment, the yaw acceleration sensor 240 provides the ECU 110 with a signal indicative of vehicle acceleration in a yaw direction (e.g., turning either left or right). In other embodiments, the ECU 110 monitors both the steering angle sensor 235 and the yaw acceleration sensor 240. The ECU 110 processes the signal from the angle sensor 230 when performing the methods described herein.

The ECU 110 sends a control message to the ABS control unit 120 over the communication bus 115 to enable or disable the ABS 102. The input/output module 215 of the ECU 110 may be linked through an external communication module on the communication bus 115. Conversely, the ECU 110 may be communicatively coupled with the ABS control unit 120 via a dedicated communication line rather than via the communication bus 115. In some embodiments, the input/output module 215 communicates by means of a protocol such as J1939 or CAN for communicating directly to the ABS control unit 120. In other embodiments, the input/output module 215 communicates under other suitable protocols, including analog or digital signals, depending on the needs of the specific application.

Figure 3:
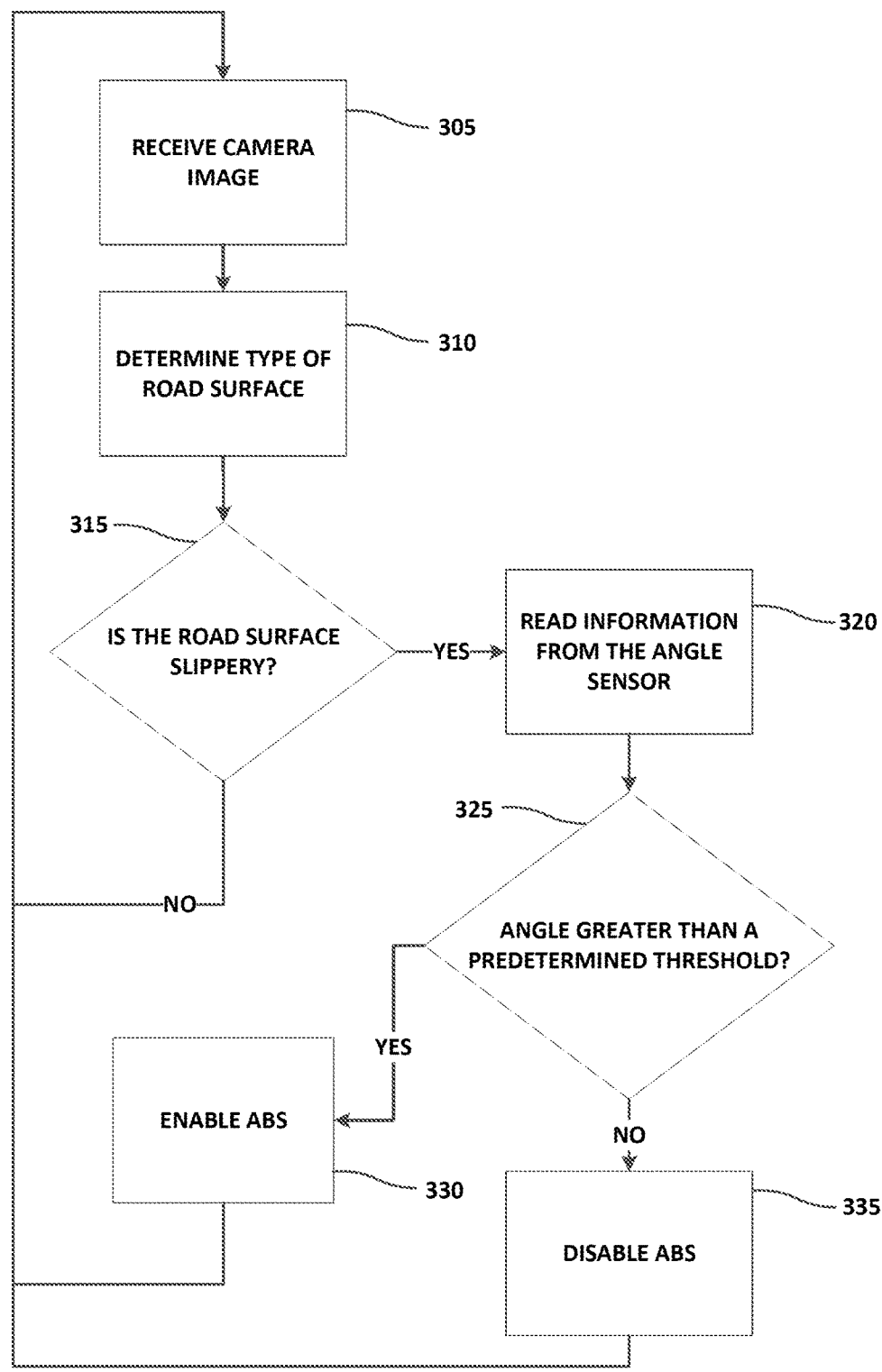
FIG. 3 is a block diagram of a method of controlling the antilock braking system of FIG. 1.

FIG. 3 illustrates a control method 300 for the ABS 102 of the vehicle 100. Advantageously, the control method 300 balances a need for short-stopping distance with a need for maintaining steering control of the vehicle 100. In normal operating conditions, such as driving on non-slippery pavement, the ABS 102 decreases stopping distance while maintaining steering control for the driver. However, in some operating conditions, such as driving on gravel or slippery pavement, the ABS 102 may increase the stopping distance of the vehicle 100 as compared to a braking system that simply locks the wheels. In either operating condition, the ABS 102 provides greater steering control of the vehicle 102. Therefore, the method 300 provides for enabling or disabling the ABS 102 depending on the type of road surface and an indication from the angle sensor of whether the driver requires steering control. The method 300 is also valid for ESP or ESC. For example, the ECU 110 may disable and enable the ESP or ESC systems in conjunction with the ABS 102.

In the method 300, the ECU 110 receives a plurality of images from the camera 105 (step 305). The ECU 110 compares the plurality of images to predetermined classifications stored in memory 225 to generate a prediction regarding the type of road surface on which the vehicle 100 is driving. When the ECU 110 predicts the type of road surface, the ECU 110 determines whether the type of road surface is slippery based on information about the road surface stored in memory 225 (step 315). The ECU 110 may determine whether the type of road surface is slippery based on information in a lookup table corresponding to types of road surfaces. The road surface is considered slippery when the vehicle 100 is expected to experience a low μ surface (i.e., a surface having a low coefficient of friction). A low μ surface may have a low skid resistance due to gravel, snow, ice, mud, or lose material on the road. For example, the ECU 110 may determine that the road surface is slippery based on an estimated coefficient of friction between the road surface and a tire (e.g., a locked tire) of the vehicle 100. If the road surface is snow-covered or wet, as determined based on, for example, an analysis of the plurality of images, the ECU 110 may classify the road surface as slippery independent of the determined type of road surface.

The ECU 110 may determine that the road surface is dry pavement, asphalt, or concrete based on classification of the plurality of images. In these cases the road surface is non-slippery, and the ECU 110 will continue to monitor and determine the type of road surface. Conversely, when the road surface is slippery, the ECU 110 reads information from the angle sensor 230 (step 320). The ECU 110 determines if the information from the angle sensor 230 signals a value greater than or less than a predetermined threshold (step 325). If the information from the angle sensor 230 signals a value greater than a predetermined threshold, then the ECU 110 sends the control signal to operate in a first mode to the ABS control unit 120 (step 330). The first mode including enabling the ABS 102. If the value is less than the predetermined threshold, the ECU 110 sends a control signal to the ABS control unit 120 to operate in a second mode (step 335). The second mode includes disabling the ABS 102. For example, information from the steering angle sensor 235 signals a value less than the predetermined threshold when the steering wheel angle is approximately straight-ahead (e.g., less than 5 degrees deviation from center). Similarly, information from the yaw acceleration sensor 240 signals a value less than the predetermined threshold when there is only slight acceleration in the yaw direction. Additionally, the ECU 110 may use information from both the steering angle sensor 235 and the yaw acceleration sensor 240. In this case, the ECU 110 determines a combined value by either averaging or taking the lowest or highest value of the information from each angle sensor 230. While sending out the control signal to the ABS control unit 120, the ECU 110 continues to repeat the method 300. Therefore, if conditions change, the ECU 110 rapidly adjusts the control output to the ABS control unit 120.

When the ECU 110 is unable to predict the type of road surface based on information stored in memory 225, the ECU 110 sets the predicted type of road surface to normal or non-slippery. In this case, the ABS control unit 120 operates in a default mode equivalent to the first mode. For example, when the ECU 110 receives obscured images from the camera 105, the ECU 110 may set the predicted road surface to normal. The ECU 110 then sends a default control message to the ABS control unit 120 to operate in the first mode. The default message control message allows the ABS control unit 120 to operate the ABS 102 under normal operating conditions when errors occur.

The method 300 allows the vehicle 100 to react to different driving conditions. For example, when the road surface is gravel or mud, deactivating the ABS 102 when the vehicle 100 is heading straight provides a beneficial decrease in stopping distance. Conversely, when the angle sensor 230 indicates that the vehicle 100 is not heading straight, the ECU 110 prevents deactivation of the ABS 102. By preventing deactivation, the ECU 110 allows the ABS 102 to continue to function. The ABS 102 helps prevent the wheels 107 from locking and thus provides the driver with greater control of the vehicle 100. However, the greater control of the vehicle 100 may be at the expense of achieving the shortest stopping distance. Therefore, to balance these needs, the ECU 110 is adjustable based on the predetermined threshold.

It should be noted that the ECU 110, in some embodiments, is programmed to detect different types of gravel surfaces based on gravel size. For example, the ECU 110 classifies gravel into small (e.g., less than 10 mm diameter), medium (e.g., from 10 mm to 50 mm diameter), or large gravel (e.g., greater than 50 mm diameter). In such embodiments, the ECU 110 provides an additional control signal to the ABS control unit 120 indicative of the type of road surface. In one embodiment, the ECU 110 calculates a coefficient of friction of the road surface based on the gravel size and adjusts the additional control signal based on the coefficient of friction. The ECU 110 may generate the additional control signal based on a lookup table of values corresponding to types of road surfaces. The ABS control unit 120 responds to the control single by adjusting braking pressure of the ABS 102 appropriate for the type of road surface.

Thus, the invention provides, among other things, a system and a method of operating a vehicle braking system based on a type of road surface and an angle sensor to balance stopping distance and vehicle control. Various features and advantages of the invention are set forth in the following claims.

What is claimed is:

1. A control system for operating a vehicle braking system, the control system comprising:
   a sensor that senses an angle of a vehicle;
   a camera configured to be attached to the vehicle with a field of view of a road surface; and
   an electronic control unit communicatively connected to the camera and communicatively connected to the sensor, the electronic control unit configured to
   receive images of the road surface from the camera,
   determine a type of road surface based on the images of the road surface, and
   generate a control message based on the type of road surface and the angle;
   a braking control unit communicatively connected to the electronic control unit, the braking control unit configured to
   receive the control message from the electronic control unit;
   operate the braking system of the vehicle;
   adjust the operation of the braking system based on the control message;
   operate in a first mode depending on the control message from the electronic control unit, wherein when operating in the first mode, the braking control unit operates the braking system with antilock braking activated; and
   operate in a second mode depending on the control message from the electronic control unit, wherein when operating in the second mode, the braking control unit operates the braking system with antilock braking deactivated.

2. The braking system of claim 1, wherein the first mode is a default mode, the first mode being activated when the electronic control unit is not able to determine a type of road surface.

3. The braking system of claim 1, wherein the braking control unit activates the first mode when the road surface is normal, and wherein the braking control unit activates the second mode when the road surface is slippery and the angle is less than a predetermined threshold.

4. The braking system of claim 3, wherein the type of road surface is normal when the road surface is at least one selected from the group consisting of dry pavement, dry asphalt, and dry concrete.

5. The braking system of claim 3, wherein the type of road surface is slippery when the road surface is at least one selected from the group consisting of small gravel, medium gravel, and large gravel.

6. The braking system of claim 3, wherein the type of road surface is slippery when the road surface is at least one selected from the group consisting of a wet surface and a snow-covered surface.

7. The braking system of claim 3, wherein the electronic control unit determines the type of road surface based on comparison of the road surface with predetermined classifications.

8. The braking system of claim 3, wherein the electronic control unit determines the type of road surface based on an estimated coefficient of friction between the road surface and a locked tire of the vehicle.

9. The braking system of claim 3, wherein the predetermined threshold of the steering angle is approximately 5 degrees from center in either direction from center.

10. The braking system of claim 1, wherein the sensor is a steering angle sensor.

11. The braking system of claim 1, wherein the sensor is a yaw acceleration sensor.

12. A method of operating a braking system of a vehicle, the method comprising:
    determining an angle of the vehicle;
    receiving an image of a road surface with a camera attached to the vehicle;
    determining, by an electronic control unit, a type of road surface based on the image of the road surface;
    sending a control message to an antilock braking system control unit based on the type of road surface and the angle;
    operating the braking system of the vehicle based on the control message;
    operating in a first mode depending on the control message from the electronic control unit, wherein when operating in the first mode, the antilock braking system control unit operates the braking system with antilock braking enabled; and
    operating in a second mode depending on the control message from the electronic control unit, wherein when operating in the second mode, the antilock braking system control unit operates the braking system with antilock braking disabled.

13. The method of operating a braking system according to claim 12, wherein the first mode is a default mode, the first mode being activated when the electronic control unit is not able to determine a type of road surface.

14. The method of operating a braking system according to claim 12, further comprising:
    operating the antilock braking system control unit in the first mode when the type of road surface is normal, and
    operating the antilock braking system control unit in the second mode when the type of road surface is slippery and the angle is less than a predetermined threshold.

15. The method of operating a braking system according to claim 14, wherein the type of road surface is normal when the road surface is at least one selected from the group consisting of pavement, asphalt, and concrete.

16. The method of operating a braking system according to claim 14, wherein the type of road surface is slippery when the road surface is at least one selected from the group consisting of small gravel, medium gravel, and large gravel.

17. The method of operating a braking system according to claim 14, wherein the type of road surface is slippery when the road surface is at least one selected from the group consisting of wet surface and snow-covered surface.

18. The method of operating a braking system according to claim 14, wherein the electronic control unit determines the type of road surface based on comparison of the road surface with predetermined classifications.

19. The method of operating a braking system according to claim 14, wherein the electronic control unit determines whether the road surface is slippery based on an estimated coefficient of friction between the road surface and a locked tire of the vehicle.

20. The method of operating a braking system according to claim 14, wherein the predetermined threshold of the steering angle is approximately 5 degrees from center in either direction from center.

\* \* \* \* \*